United States Patent

Vinal

[15] 3,680,064

[45] July 25, 1972

[54] COAXIAL ANISOTROPIC MAGNETIC FILM STORAGE DEVICE WITH BURST CYCLE WRITING

[72] Inventor: Albert W. Vinal, Owego, N.Y.

[73] Assignee: International Business Machines Corporation, Armonk, N.Y.

[22] Filed: April 23, 1970

[21] Appl. No.: 31,211

[52] U.S. Cl...............340/174 QA, 340/174 PW, 30/174 TF, 340/174 M, 340/174 BA

[51] Int. Cl.....................................G11c 11/04, G11c 11/14

[58] Field of Search..............................340/174 TF, 174 PW

[56] References Cited

OTHER PUBLICATIONS

IBM Technical Disclosure Bulletin Vol. 9; No. 1, June 1966 pgs. 73-74

IBM Technical Disclosure Bulletin Vol. 7, No. 9 Feb. 1965. pgs. 811-812

*Primary Examiner*—James W. Moffitt

*Attorney*—Ralph L. Thomas and Thomas & Thomas

[57] ABSTRACT

A memory cell composed of a pair of coaxial anisotropic magnetic films separated by a coaxial barrier film represents binary information by anti-parallel magnetic fields in the pair of magnetic films. Burst cycle writing is used to change the binary storage state of the memory cell. This involves the application of N word current pulses $I_w$ each of which passes along a conductor enclosed by coaxial magnetic film layers to apply a magnetic field to said coaxial magnetic film layers and simultaneously with each such word current pulse $I_w$ a pair of bipolar bit current pulses $I_b$ are applied to an insulated conductor which extends around and in non-electrical contact with the outer most magnetic film of the memory cell to apply an axial magnetic field to said coaxial magnetic films. The burst number N is inversely proportional to the amplitude of the word current pulses and the bit current pulses.

10 Claims, 22 Drawing Figures

INVENTOR
ALBERT W. VINAL

BY Thomas & Thomas
ATTORNEYS

COAXIAL ANISOTROPIC MAGNETIC FILM STORAGE DEVICE WITH BURST CYCLE WRITING

CROSS-REFERENCES TO RELATED APPLICATIONS

Application Ser. No. 693,409, now U.S. Pat. No. 3,576,552 filed on Dec. 26, 1967 for Magnetic Film Memory Element by Albert W. Vinal.

BACKGROUND OF THE INVENTION

1. This invention relates to writing techniques for memory systems which utilize magnetic storage elements and more particularly to such memory systems utilizing magnetic storage elements which employ a pair of coaxial magnetic films separated by a coaxial conductive barrier film.

2. One type of storage system used quite widely today is the read only store. Information stored in such storage devices may be continuously read, but it is never changed. There are numerous applications where this is desirable e.g. logarithm tables. However, there are some applications where information is stored and continuously read, but infrequently it is necessary to change the information. It is desirable in such types of devices to provide the capability for occasional writing operations without increasing the complexity of the system (and thereby reduce reliability and increase costs of manufacturing and repair), and it is to this problem that the present invention is directed.

SUMMARY OF THE INVENTION

It is a feature of this invention to provide a novel arrangement for occasionally electrically altering the content of a store which continuously may be read nondestructively.

It is a feature of this invention to provide a novel method of writing in a memory cell by utilizing a burst of pulses.

It is a feature of this invention to provide a writing arrangement for a memory device having storage cells each of which is composed of a pair of coaxial anisotrophic magnetic film separated by a coaxial barrier film, and the writing arrangement uses a burst of N unidirectional word current pulses $I_w$ each of which is syncronized with a pair of bidirectional bit current pulses $I_b$ to cause a reversal in the storage state to take place. The amplitude of the bit current required to effect a change in storage state is inversely proportional to the number of pulses N in the burst.

It is a feature of this invention to provide a storage device which employs storage elements composed of a pair of coaxial anisotropic magnetic films separated by a coaxial barrier film, and a unidirectional word current $I_w$ is used for both reading and writing operations.

It is a further feature of this invention to provide such a memory device with word lines disposed according to one coordinate of an array and bit lines disposed according to a second coordinate of an array. Multiple words are disposed on the word lines, and the word current $I_w$ is the same for both reading and writing operations. Moreover, one word may be written while simultaneously one or more other words may be read from the same word line.

It is a further feature of this invention to provide for reading and writing operations in a memory device of the character described which permits substantial variations in the amplitude of the word current pulses without destroying the information content of memory cells during reading operations and which insures reliable changes in state during writing operations.

It is a feature of this invention to provide a storage device of the type described wherein reading and writing operations may be performed by a burst of unidirectional word current pulses $I_w$ and syncronized pairs of bi-directional current pulses $I_b$, and reliable memory operation may be obtained even though the memory device is exposed to stray electromagnetic fields of known intensity.

It is a feature of this invention to provide in a memory of the character described for reading and writing operations with a burst of unidirectional word pulses $I_w$ each of which is syncronized with a pair of bi-directional bit current pulses $I_b$ forming a doublet which render the information state of the storage element invulnerable to spurious noise signals that may appear on word and bit lines during scheduled reading operations.

It is a feature of this invention to provide a memory system which may be read nondestructively, and the storage element includes a pair of coaxial anisotropic magnetic films separated by a coaxial barrier film. A word current pulse $I_w$ is used for both reading and writing operations. The word current $I_w$ produces a magnetizing field within the magnetic storage element having an intensity in excess of the intrinsic anisotropic field constant of the magnetic films which compose the storage element.

In one arrangement according to this invention word lines are provided according to a first coordinate of an array, and bit lines are provided according to a second coordinate of an array. A storage element is disposed at each coordinate intersection of the word lines and the bit lines. Each storage element comprises a pair of coaxial anisotropic magnetic films separated by a coaxial barrier film, and this assembly is disposed around the word line at each coordinate intersection. A bit driver is connected to each bit line for supplying a pair of bi-directional bit current pulses $I_b$ for writing operations. A sense amplifier is connected to each bit line for the purpose of detecting the storage state of the selected bit during read operations. A plurality of words, each composed of a plurality of bits, may be stored on each word line. When a word current pulse $I_w$ is applied to a selected word line, a plurality of words may be read therefrom, or some words may be read therefrom while one or more other words may be written on the selected line. For a writing operation, however, a burst of N word current pulses $I_w$ are supplied with a plurality of pairs of bi-directional current pulses which are syncronized with the word current pulses.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
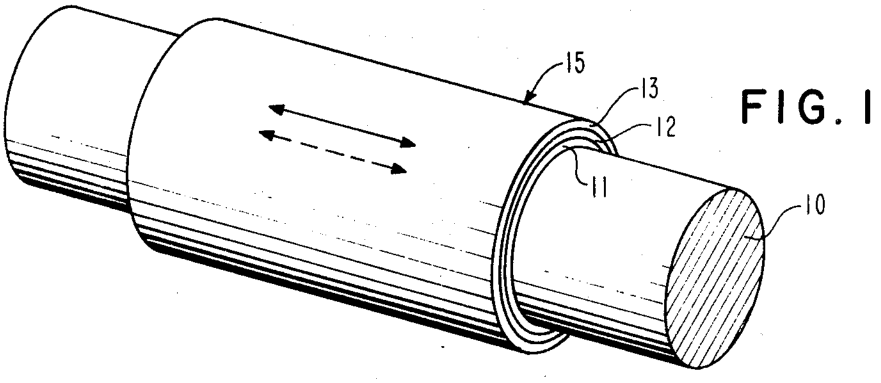
FIG. 1 illustrates a storage element employed in this invention.

The basic storage element of this invention is illustrated in FIG. 1, and it includes a conductor 10 which may be beryllium copper, for example. The wire 10 serves as a substrate on which a first anisotropic magnetic film 11 is disposed. A barrier film 12 is disposed over the magnetic film 11, and it is made of a conductive material such as copper, nickel, tin, etc. A second anisotropic magnetic film 13 is disposed on the barrier film 12. The easy axis of magnetization of the magnetic films 11 and 13 is parallel to the cylindrical axis of these two films. For a more detailed description of the materials and dimensions of the storage element in FIG. 1, reference is made to the above mentioned copending application.

Figure 2:
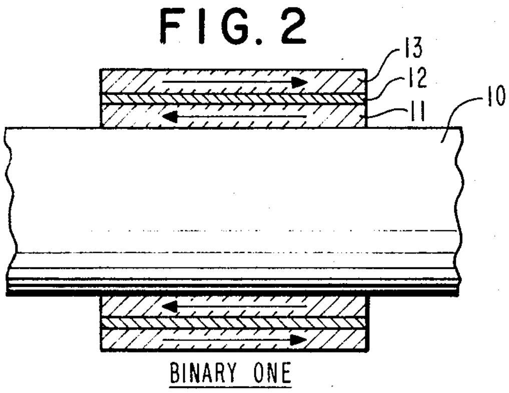
FIGS. 2 and 3 illustrate magnetic field directions which are arbitrarily chosen to represent binary storage states.
Figure 3:
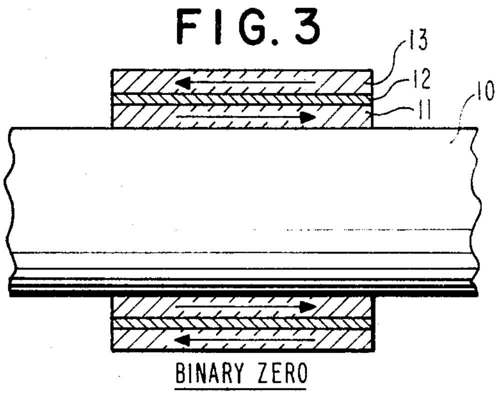

The magnetic films 11 and 13 are magnetized along the easy axis which is parallel with the cylindrical axis of the substrate conductor 10 with the direction of the magnetic field in the cylindrical magnetic film 11 being opposite to the direction of the magnetic field in the cylindrical magnetic film 12. FIGS. 2 and 3 are cross-sectional views of the storage element in FIG. 1, and they illustrate the two magnetic stable states for representing binary information. When the direction of the magnetic field in the cylindrical ferromagnetic film 11 is to the left, as depicted in FIG. 2, and the direction of the magnetic field in the cylindrical ferromagnetic film 13 is to the right, this state of magnetization is arbitrarily designated as binary one. When the direction of the magnetic field of the cylindrical ferromagnetic film 11 is to the right, as depicted in FIG. 3, and the magnetic field of the cylindrical ferromagnetic film 13 is to the left, this state of magnetization is arbitrarily designated as binary zero.

Figures 4, 5:
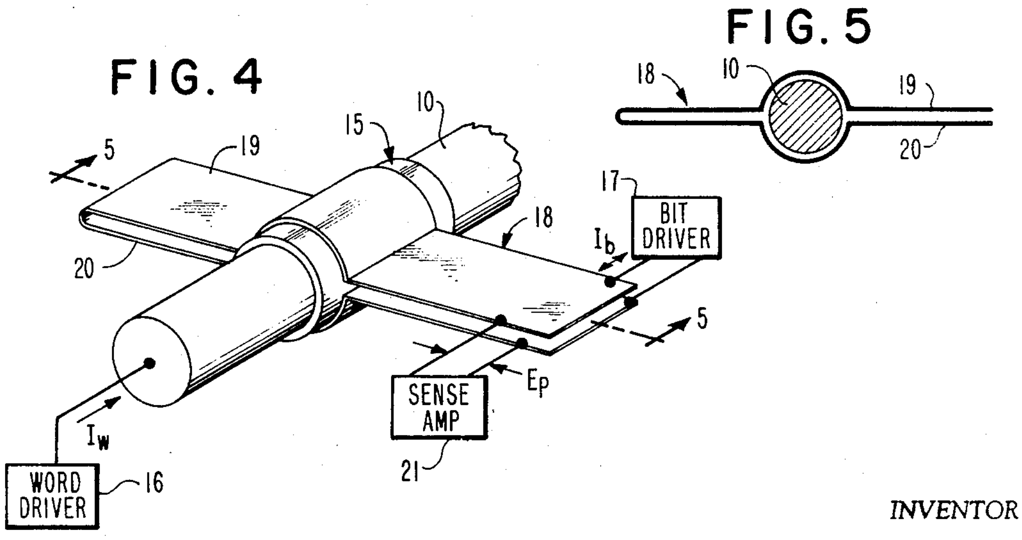
FIG. 4 shows a storage element of this invention with operating circuits connected thereto.
FIG. 5 is a cross-sectional view of the storage element taken on the line 4—4 in FIG. 4.

Referring next to FIG. 4, the storage element in FIG. 1 is shown with operational circuits. The storage element, designated generally by the reference numeral 15, in FIG. 4 is identical in construction to that shown in FIG. 1.

The conductor 10 is energized with a current by a word driver 16 for read and write operations as explained more fully hereinafter. A bit driver 17 is connected to a winding 18 which consists of an upper conductive portion 19 and a lower conductive portion 20. The bit driver 17 energizes the conductors 19 and 20 with a current during write operations. A sense amplifier 21 is connected to the conductors 19 and 20, and it detects signals during a read operation to indicate the binary storage state. The conductors 19 and 20 form a continuous current path around the storage element 15 as seen more clearly in FIG. 5. FIG. 5 is a cross-sectional view taken on the line 5—5 in FIG. 4 with the layers comprising the bit 15 omitted in the interest of simplicity.

Figure 6:
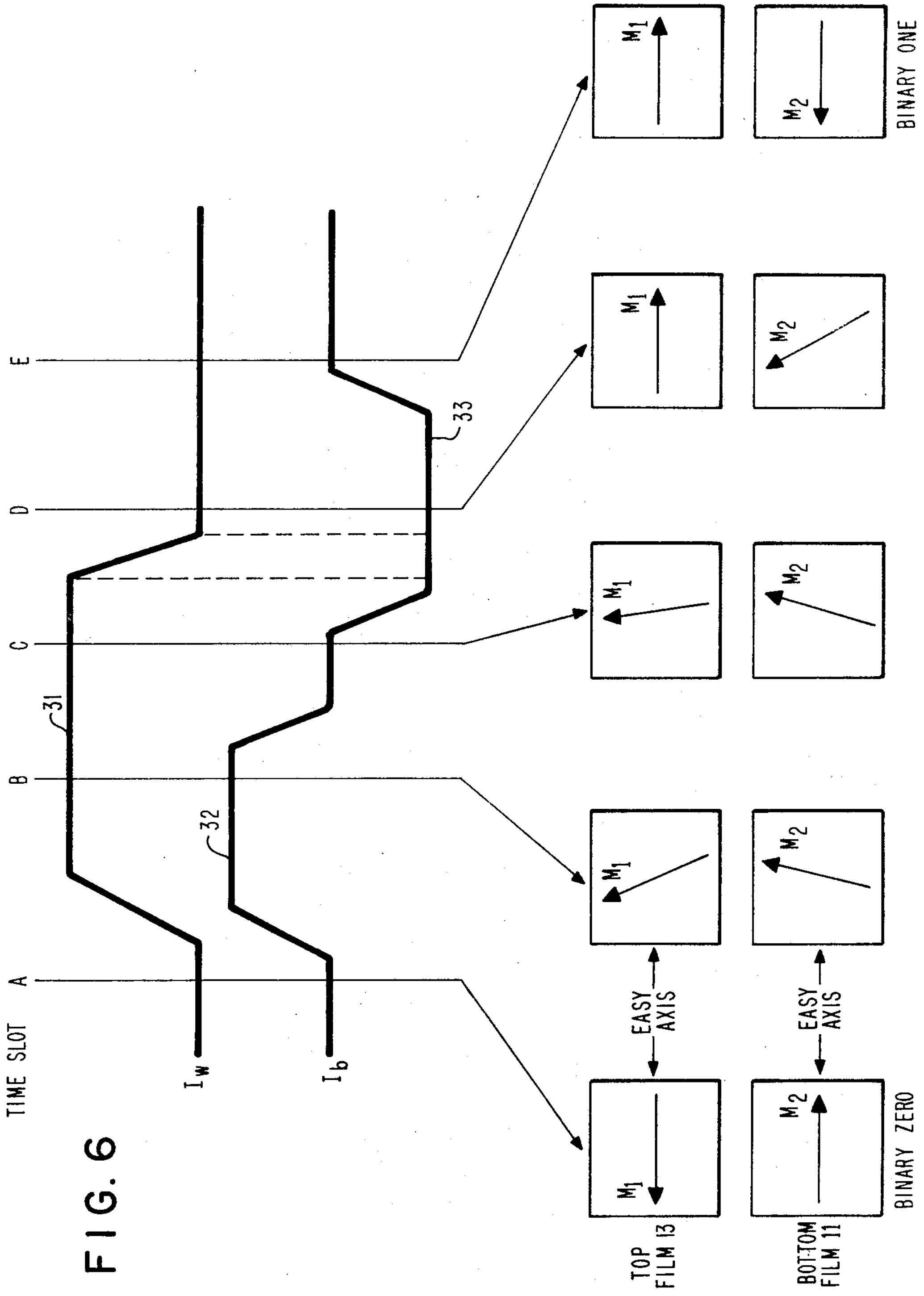
FIGS. 6 and 7 show waveforms helpful in explaining writing operations in the memory cell of FIG. 4.

Whenever a writing operation takes place, the word driver 16 supplies a current $I_w$ through the conductor 10, and the bit driver 17 supplies a bit current $I_b$ through the conductors 19 and 20. During a writing operation the sense amplifier 21 is not used, and it is disabled to prevent damage from the bit current and the write current. The word current $I_w$ is unipolar for both read and write operations. The bit current $I_b$ is bipolar, and it is used only for write operations. FIG. 6 shows the relationship of the word current $I_w$ and the bipolar bit current $I_b$. Such write currents caused the magnetization of the storage element 15 in FIG. 4 to change from the binary zero state to the binary one state. The change in magnetization of the top film 13 and the bottom film 11 of the storage element 15 in FIG. !1 is depicted in the lower portion of FIG. 6. The Vector $M_1$ represents the direction of magnetization of the top film 13 and the magnetic Vector $M_2$ represents the direction of magnetization of the bottom film 11. At time A in FIG. 8 the storage element 15 in FIG. 4 is in the binary zero state with the magnetic Vectors $M_1$ and $M_2$ being opposite in direction but substantially parallel with the longitudinal axis of the conductor 10. As the word current $I_w$ travels through the conductor 10, the magnetizing field produced by this current is directed circumferentially about conductor 10, and it acts in a direction perpendicular to the easy magnetic axis of the magnetic films 11 and 13 in FIG. 1. The bit current $I_b$ passes through the straps 19 and 20 in either direction, and the magnetizing field produced by this current is directed parallel to the easy magnetic axis of the films 11 and 13. The waveform of the word current $I_w$ is designated by the reference numeral 31 in FIG. 6, and the bipolar current pulses of the bit current $I_b$ are designated by the reference numerals 32 and 33. The current pulses 31 and 32 are coincident, and they are effective to rotate the magnetic vectors $M_1$ and $M_2$ as shown. The bit current pulse 32 may be termed the accelerator bit pulse because the coincident action of this current pulse 32 with the current pulse 31 in FIG. 6 causes magnetization within the lower film 11 to rotate at as fast a rate and through as large an angle as practical. The rate of rotation of magnetization with the film 11 is retarded by the presence of the conductive barrier film 12 because the conductive barrier layer 12 serves as a conductive shell, in essence a shorted turn, which completely encompasses the bottom magnetic film layer 11, and as the magnetization within the lower film layer 11 rotates, a current is induced in the conductive barrier film 12 which is directed circumferentially around the closed contour. This induced current produces a solenoidal field the effect of which is to retard the rotation rate of the magnetization within the bottom magnetic film layer 11. It is pointed out that the top magnetic film 13 experiences virtually none of the induced solenoidal field except at the remote ends, and hence its rotation rate is not materially retarded by the solenoidal fields. The action of the accelerator bit field produced by the current pulse 32 in FIG. 6 minimizes the effects of the dynamic solenoidal field developed by the conductive barrier layer 12. The duration of the pulse 31 in FIG. 6 is preferably adjusted to be substantially equal to the barrier induced time constant which time constant is discussed in the above-mentioned patent application. The effect of the magnetic field produced by the current pulse 31 alone is sufficient to rotate the magnetic vectors $M_1$ and $M_2$ in FIG. 6 approximately 50° from the easy axis. The combined effect of the current pulses 31 and 32 in FIG. 6 is sufficient to rotate the magnetic vectors $M_1$ and $M_2$ substantially closer to the hard magnetic axis corresponding to a rotation angle of 90°. This is shown by the magnetic vectors $M_1$ and $M_2$ at time B in FIG. 6. When the accelerator current pulse 32 in FIG. 6 terminates, its magnetic field collapses and the magnetic field supplied by the current pulse 31 persists. The magnetic field applied by the current pulse 31 is perpendicular to the easy magnetic axis of the magnetic films 11 and 13. Consequently, the magnetic vectors $M_1$ and $M_2$ are rotated substantially 90° from the easy magnetic axis of the films 11 and 13. This is depicted by the magnetic vectors $M_1$ and $M_2$ for time C in FIG. 6. When the current pulse 33 is applied, it overlaps a portion of the current pulse 31, and the trailing edge of the current pulse 31 takes place after the current pulse 33 reaches full amplitude. For the period of time that the current pulses 31 and 33 are coincidentally applied, a circumferential magnetic field produced by the pulse 31 and a magnetic field parallel to the easy axis of the magnetic films 11 and 13 produced by the pulse 33 generate a combined magnetic field which swings the magnetic vectors $M_1$ and $M_2$ beyond an angle of 90°, thereby reversing the direction of magnetization along the easy axis of the magnetic films 11 and 13. When the current pulse 31 in FIG. 6 terminates, the current pulse 33 persists, and the resulting magnetic field applied to the storage element 15 in FIG. 4 is parallel to the easy axis of magnetization. At time D in FIG. 6 the magnetic vector $M_1$ of the top film 13 rotates to the point where it is parallel with the easy magnetic axis. Thus, the magnetic vector $M_1$ in the top film 13 completes its rotation from the binary zero to the binary one state. The magnetic vector $M_2$ however, has not at this time completed a reversal in direction. In this connection it is pointed out that the combined action of the trailing edge of the pulse 31 in FIG. 6 with the pulse 33 produce a magnetic field which forces the magnetization within the top film layer to rotate so as to lie parallel with its easy magnetic axis. Once this occurs, the lower magnetic film 11 is exposed to the demagnetizing fields produced principally by the longitudinal magnetization within the top film 13. The combined action of demagnetizing fields and the intrinsic anisotropic field within the lower magnetic film 11 act to force magnetization within the bottom film 11 to assume the stable anti-parallel position relative to the magnetization within the top film 13. Thus at time E in FIG. 6 the magnetic vectors $M_1$ and $M_2$ lie substantially parallel but in opposite directions thereby to represent the binary one state. Hence it is seen how a binary one is written.

Figure 7:
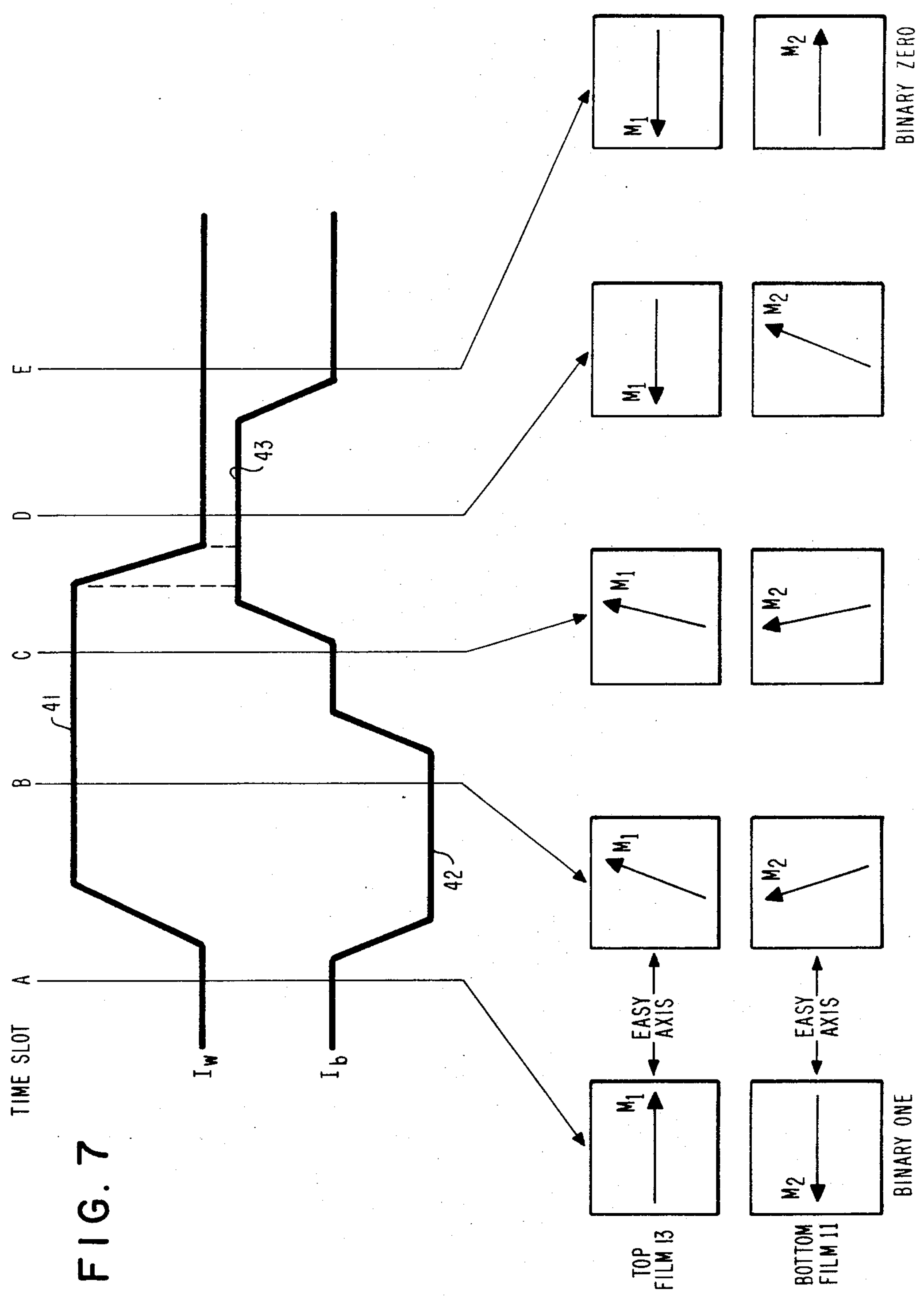

If subsequently it is desired to reverse the state of the storage element 15 in FIG. 4, a word current pulse $I_w$ is applied by the word driver 16 to the conductor 10, and bipolar bit current pulses $I_b$ are applied to the conductors 19 and 20 by the bit driver 17. The unipolar word current $I_w$ is shown as a pulse 41 in FIG. 7. The bipolar bit current pulses $I_b$ supplied by the bit driver 17 are shown as the current pulses 42 and 43 in FIG. 7. It is pointed out that the pulses 42 and 43 in FIG. 7 are opposite in direction to the corresponding pulses 32 and 33 in FIG. 6. The bottom film 11 and the top film 13 in FIG. 1 undergo a reversal in the direction of magnetization from the binary one state to the binary zero state. The changes which take place by the magnetic vectors $M_1$ and $M_2$ at the times A, B, C, D, and E are depicted in FIG. 7. The events which take place are similar to those explained above except the magnetic vectors $M_1$ and $M_2$ rotate in the opposite direction, and thus it is seen how a binary zero is written.

Figure 8:
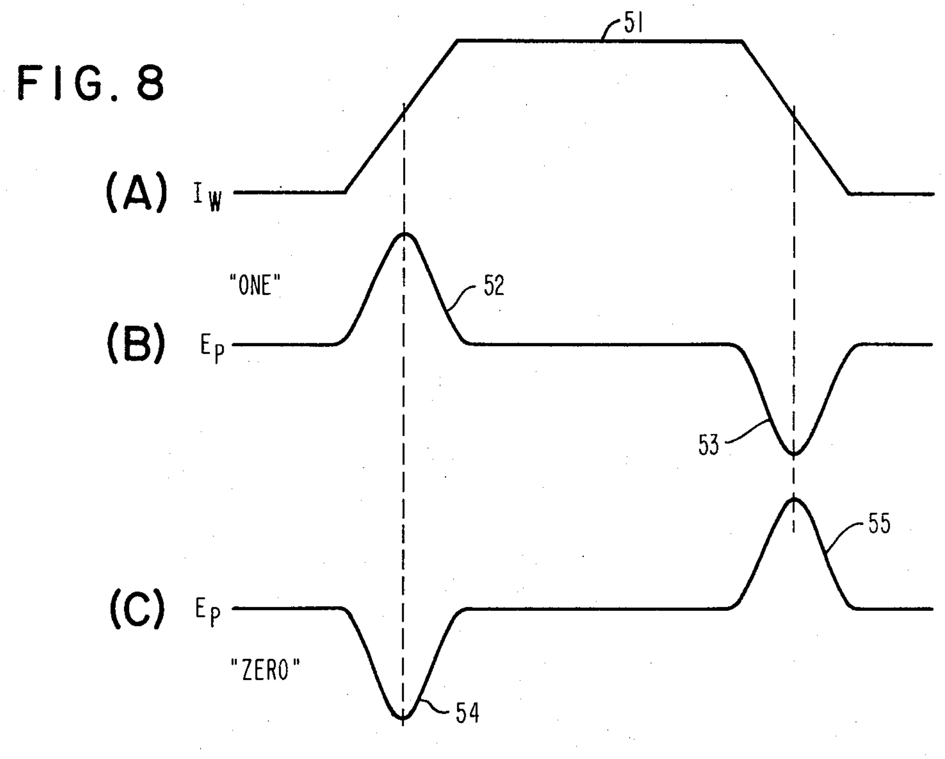
FIG. 8 shows waveforms helpful in explaining read operations from the memory cell in FIG. 4.

Information stored in the memory cell 15 in FIG. 4 is interrogated by supplying a word current $I_w$ from the word driver 16 to the conductor 10. The bit driver 17 is deactivated during read operations. The word current $I_w$ in the conductor 10 disturbs the magnetic fields in the storage element 15, and signals induced in the component parts 19 and 20 of the winding 18 are supplied to the sense amplifier 21 which indicates the storage state of the memory cell 15. In FIG. 8 (A) a read current $I_w$ is illustrated by the waveform 51. If the memory cell 15 in FIG. 4 stores a binary one, the waveform of the signal induced in the winding 18 is a positive excursion 52 followed by a negative excursion 53 as shown in FIG. 8 (B). If the memory cell 15 in FIG. 4 stores a binary zero, the waveform of the signal induced in the winding 18 is a negative excursion 54 followed by a positive excursion 55 as illustrated in 8 (C).

Figure 9:
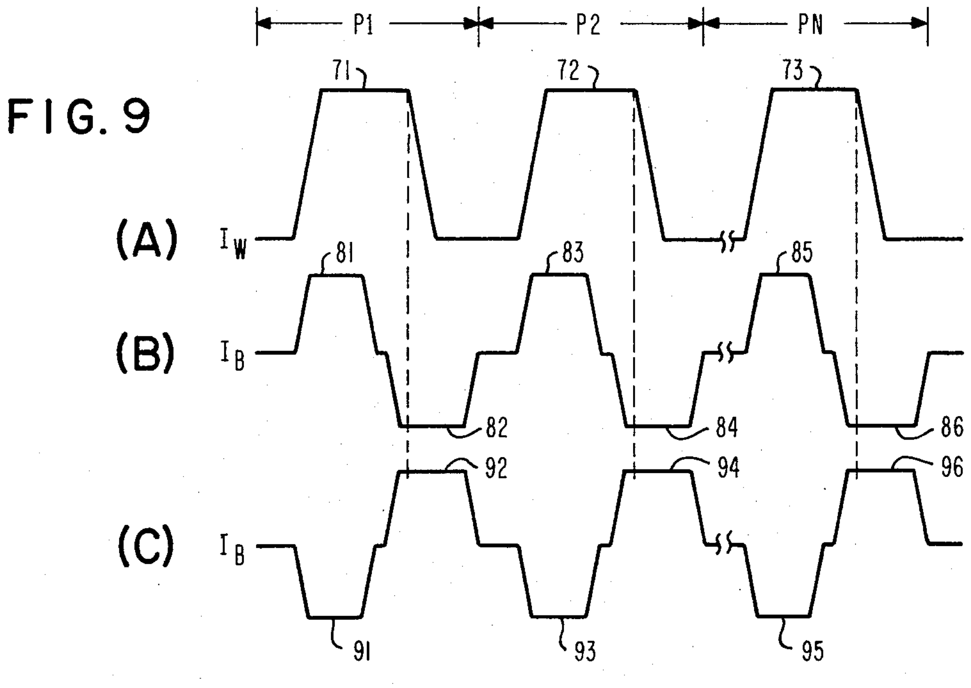
FIG. 9 shows a series of pulses which illustrate the burst writing technique of this invention.

It is a feature of this invention to provide an improved writing technique termed burst cycle writing. Writing according to this technique involves the use of a plurality of word current pulses $I_w$ which are applied coincidentally with a plurality of bit current pulses $I_b$. A principal advantage is the reduction in amplitude of the word current pulses and the bit current pulses required to perform a write operation. Next the burst cycle writing technique is described, and reference is made to FIG. 9 for this purpose. A plurality of word current pulses 71 through 73 in FIG. 9 (A) are applied to the conductor 10 in FIG. 4 by the word driver 16. The bit driver 17 in FIG. 4 supplies bit current pulses 81 through 86 in FIG. 9 (B) to the conductors 19 and 20 in FIG. 4 when a binary one is to be written. The bit driver 17 in FIG. 4 supplies bit current pulses 91 through 96 in FIG. 9 (C) to the conductors 19 and 20 in FIG. 4 whenever a binary zero is to be written. The relationship of the word current pulses 71 through 73 in FIG. 9 (A) and the bit current pulses 81 through 86 in FIG. 9 (B) are identical to the relationship of the word current pulse 31 and the bit current pulses 32 and 33 in FIG. 6. In like fashion, the relationship of the word current pulses 71 through 73 in FIG. 9 (A) and the bit current pulses 91 through 96 in FIG. 9 (C) are identical to the relationship of the word current pulse 41 and the bit current pulses 42 and 43 in FIG. 7. The magnitude of the signals depicted in FIGS. 6, 7 and 9 are not drawn to scale. However, it is emphasized that the amplitude of the signals in FIG. 9 are substantially less than those shown in FIGS. 6 and 7. In this connection it is pointed out that the magnitude of current required to operate the memory cell in FIG. 4 using the signals of FIGS. 6 and 7 is so great as to be impracticable for most installations because the power requirements are so high. However, by using the burst writing technique illustrated in FIG. 9, a practical arrangement is easily provided because the power requirements are so nominal.

Figure 10:
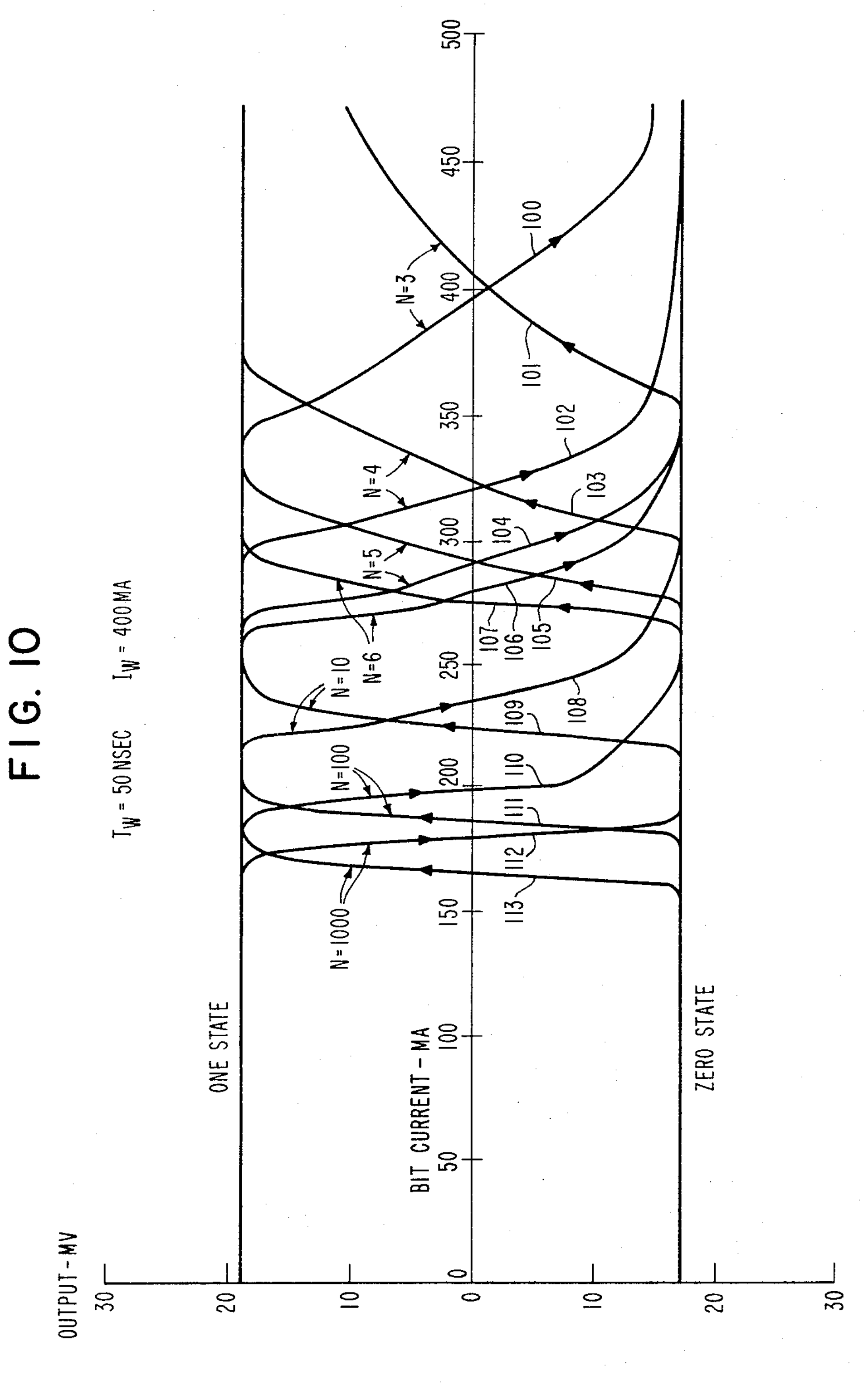
FIGS. 10, 11, 12 and 13 show curves which are helpful in defining the relationship between burst number N and the amplitudes of word current pulses and bit current pulses.
Figure 11:
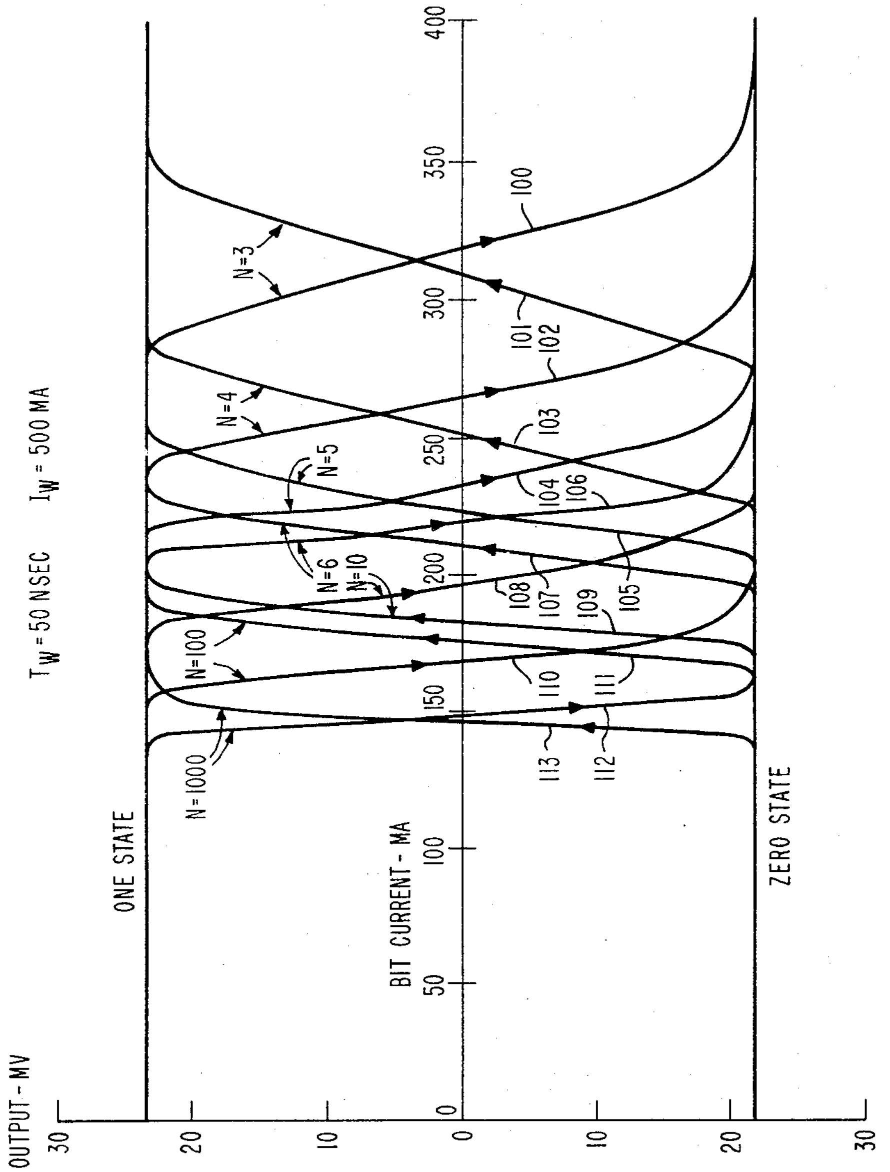
Figure 12:
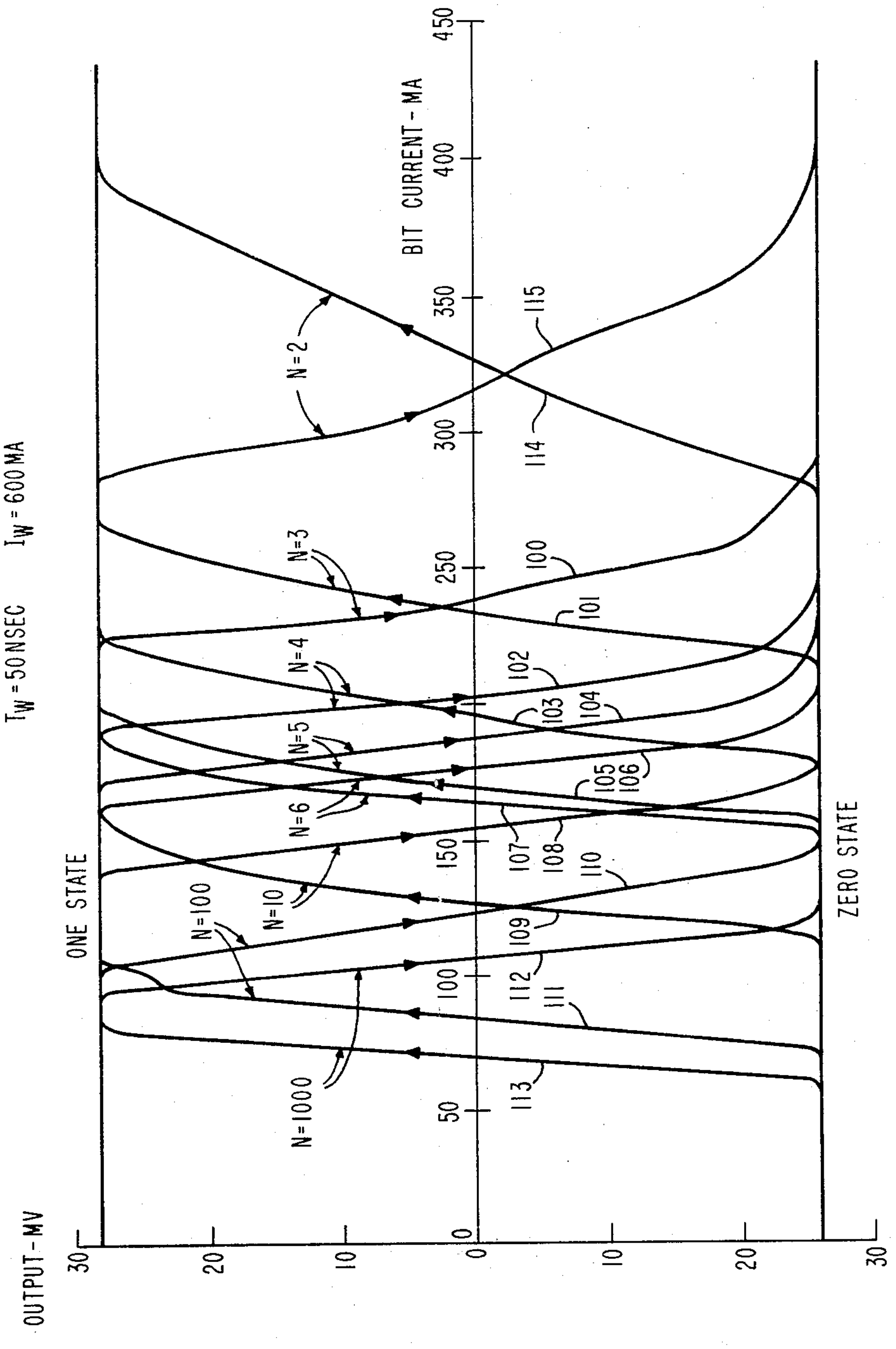

Reference is made next to FIGS. 10 through 12 for a comparison of variations in bit current and word current amplitudes required to write a binary one or a binary zero in the memory cell of FIG. 4 as a function of the burst number N where N is any integer equal to or greater than 2. For this discussion the burst number N is the number of word current pulse $I_w$, as illustrated in FIG. 9, employed to perform a writing operation. The lines 100 through 113 in FIG. 10 show the bit currents required to perform a writing operation using respective burst numbers 3,4,5,6,10,100 and 1,000 for word current pulses of 400 milliamps. For a bit current of approximately 400 milliamps a burst number of 3 is adequate. However, if a burst number of 4 is used, a smaller bit current of approximately 325 milliamps is sufficient. For a burst number of 10 a bit current of approximately 235 milliamps is sufficient, but the bit current may be reduced to approximately 200 milliamps if a burst number of 100 is used. For a burst number of 1,000 a bit current of approximately 180 milliamps is effective. It is readily seen from these curves that the amplitude of the bit current may be reduced considerably as the burst number is increased. The curves in FIG. 10 are based on word current pulses having an amplitude of 400 milliamps and a pulse width of 50 nanoseconds. If the word current amplitude is increased, the bit current amplitude may be reduced where the same burst number is employed. This is illustrated in FIGS. 11 and 12 wherein corresponding curves are labelled with the same reference numerals employed in FIG. 10. Note, for example, that when the word current is 500 milliamps, the case for FIG. 11, a bit current of approximately 315 milliamps is sufficient for a writing operation with a burst number of 3, and a writing operation may be performed with a bit current of only 235 milliamps, more or less, when the word current is increased to 600 milliamps as illustrated in FIG. 12. By comparing the bit current values for the various burst numbers in FIG. 10 with the bit current values and the various burst numbers in FIGS. 11 and 12 is readily seen that the amplitude of the bit current may be reduced substantially as the word current is increased for given burst numbers. In FIG. 12 the curves 114 and 115 show the bit current required for a burst number of 2. The bit current value for a burst number of 2 can be shown in FIG. 12 since the bit current value is within the value range of the charts for a word current of 600 milliamps.

Figure 13:
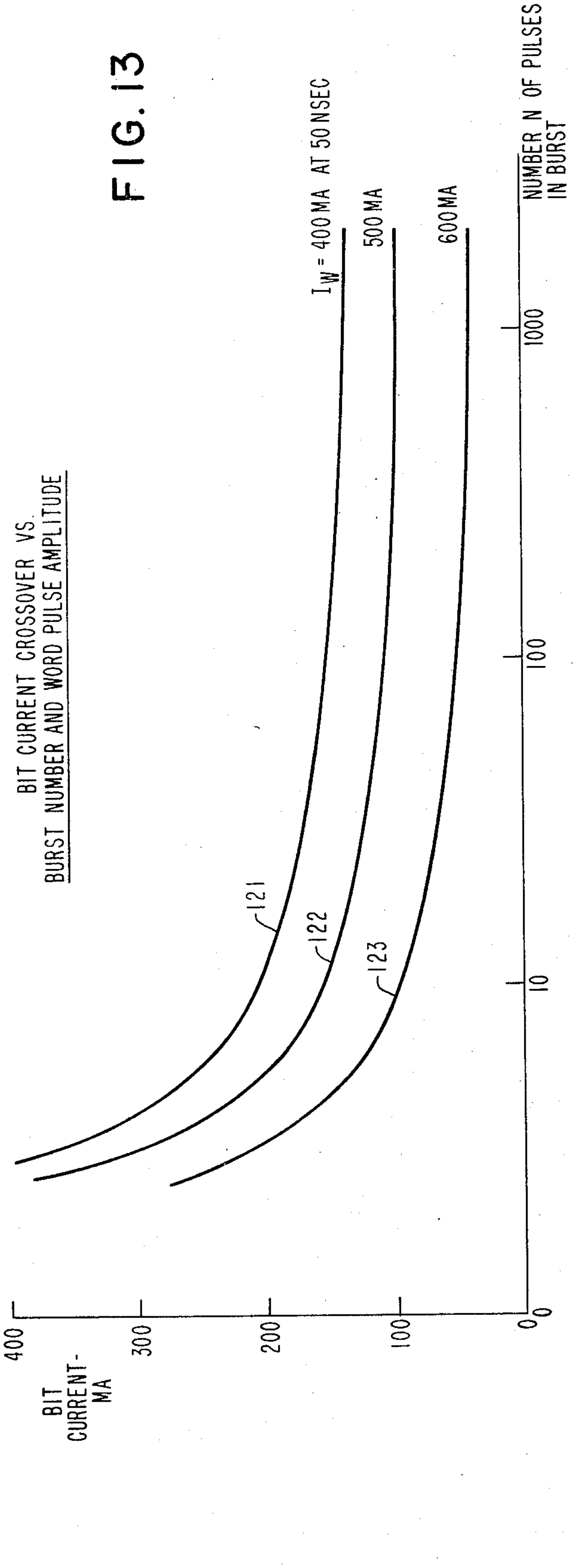

Reference is made next to FIG. 13 which presents more graphically the relationship between bit current amplitude and the burst number. The curves 121, 122 and 123 represent respective word currents of 400 milliamps, 500 milliamps, and600 milliamps with the word current pulses having a duration of 50 nanoseconds. It is readily seen by inspection of FIG. 13 that the magnitude of the bit current may be reduced as the burst number increases for a given pulse width and amplitude of word current.

Figure 14:
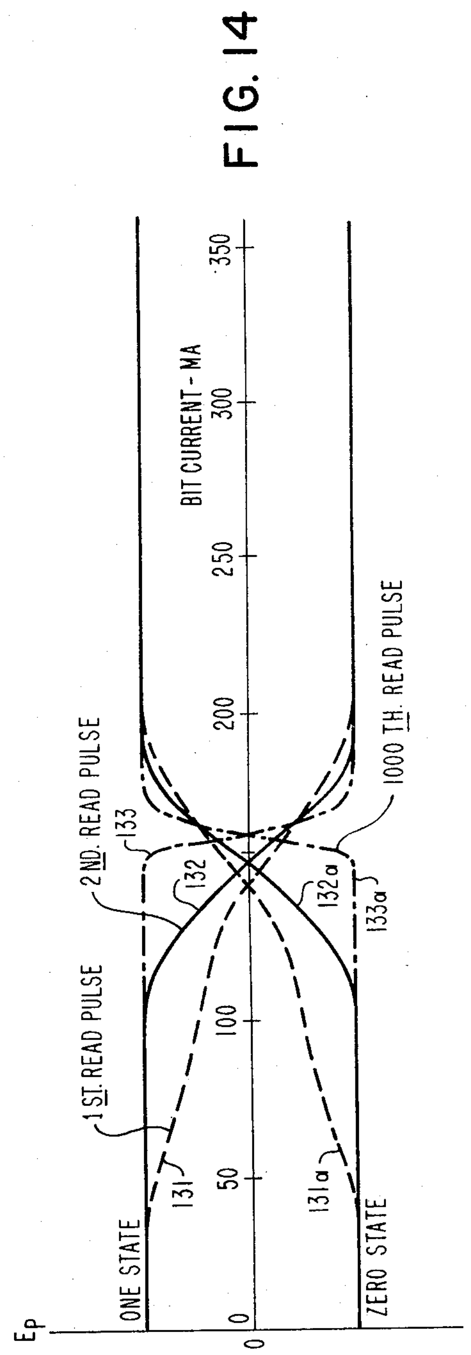
FIG. 14 shows how read pulses disturb a memory cell toward its stable state after a write operation.

Once information is written in the memory cell of FIG. 4, the information thereafter may be read nondestructively by a word current $I_w$ supplied to the conductor 10 by the word driver 16. A unique aspect of this invention is the manner in which read pulses $I_w$ disturb the memory cell toward its stable state. In essence the read pulses $I_w$ improve the storage state of the memory cell. This is in contrast to other types of magnetic storage devices wherein read signals disturb the cell from its storage state. Reference is made to FIG. 14 which shows the cell output voltage $E_p$ plotted against bit current. In this type of plot, known by those skilled in the art as a one-zero transition plot, the voltage $E_p$ is the voltage induced across the conductors 19 and 20 in FIG. 4 in response to a read or word current pulse $I_w$. The curve 131 in FIG. 14 shows the characteristic of the output signal in response to a first read pulse after a burst of N Write pulses enducing a forced "one" – "-zero" state transition. The curve 131*a* shows the characteristics of the output signal in response to a first read pulse after a burst of N Write pulses enducing a forced "zero" –

"one" transition. The curve 131 and the curve 131a are depicted with dotted lines to distinguish them from the remaining curves. The curves 132 and 132a drawn in full lines for contrast, show the respective "one"–"zero" and "zero"–"one" transitions measured in response to a second read pulse after a burst of N Write pulses. The disturb to state property of the device readily can be appreciated by comparing, for example, the signal response $E_s$ for the line 132 with that of the line 131 as a function of bit current level. It is shown that for a substantial range of bit current, one read pulse terminating a burst of N Write pulses is capable of erasing the effects of a partial state change produced by the series of N Write pulses.

The curves 133 and 133a in FIG. 14, drawn in broken lines for contrast, show the "one"–"zero" and "zero"–"one" transitions, respectively. as measured in response to a read pulse preceded by 1,000 pre-read pulses occurring after a burst of N Write pulses.

State reversal is shown to be accomplished at substantially the same bit current level as for previous examples. However, the steeper nature of the state transitions further illustrate graphically the disturb toward state feature of this invention.

Figure 15:
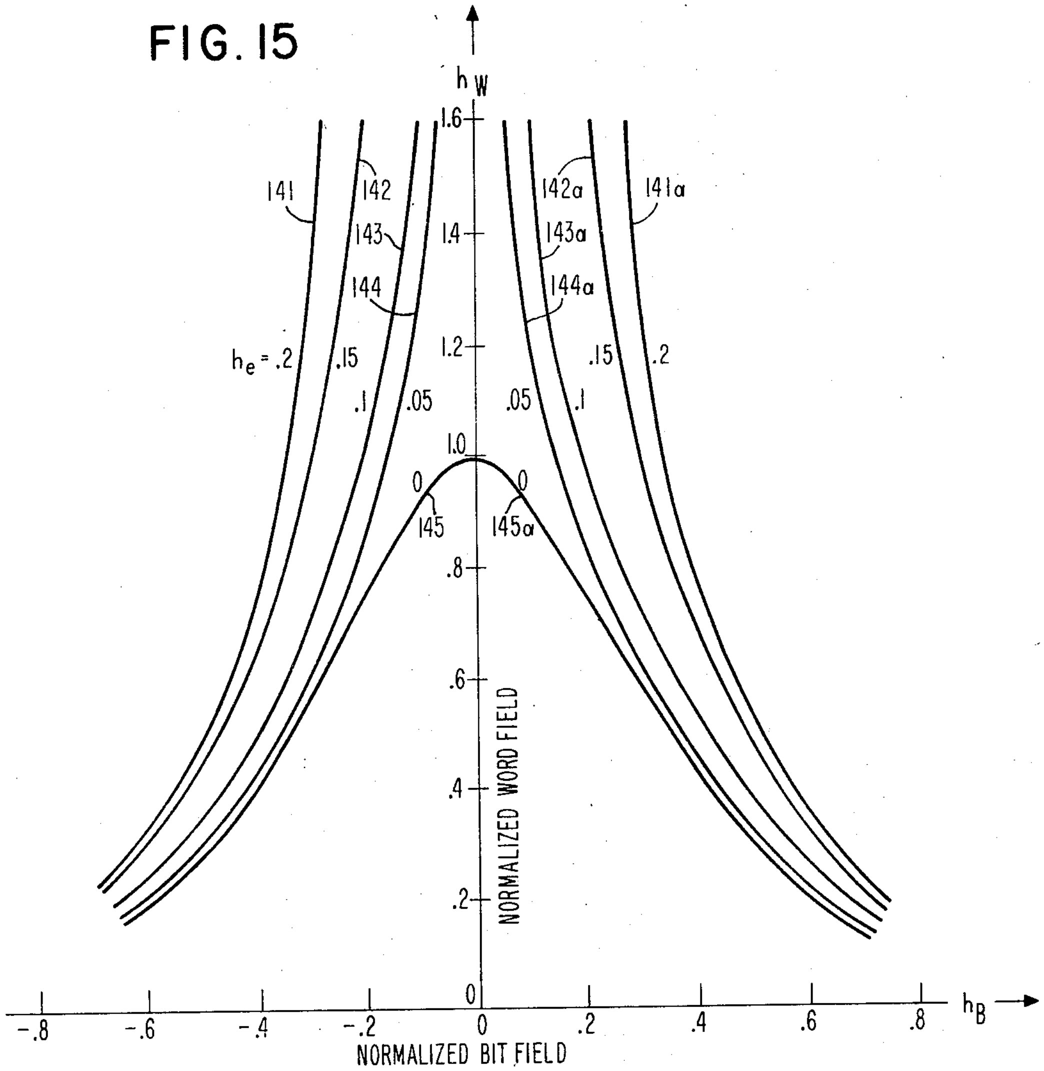
FIG. 15 is a diagram showing the dynamic characteristic of the normalized bit field and the normalized word field.

Reference is made next to FIG. 15 for a plot of the normalized bit field $h_B$ versus the normalized word field $h_W$ for the storage cell of FIG. 1. This is a dynamic switching state diagram. The curves 141 through 145 show the relationship of the normalized bit field $h_B$ and the normalized word field $h_W$ for values of the normalized eddy current fields $h_e$ produced by the barrier layer of 0.2, 0.15, 0.1, 0.05 and 0.00, respectively. The curves 141 through 145 show the variations of the normalized word field for a normalized bit field in one direction, and the curves 141a through 145a show corresponding variations for a bit field in the opposite direction. The normalized eddy current field $h_e$ produced by the barrier layer is defined by the equation $$h_e=\frac{H_e}{H_{K_1}}$$

where $H_e$ is the intensity of the eddy current field and $H_{K_1}$ is the anisotropy field of the inner film 11 in FIG. 1. The curves in FIG. 15 are drawn for a memory cell where the intrinsic anisotropy magnetic field of the inner cylinder is equal to the intrinsic anisotropy field of the outer cylinder; the normalized demagnetizing field $h_d$ in the center of the bit is 0.25; and the product of the saturation magnetization of the outer cylinder 13 and the thickness of the outer cylinder is equal to the product of the saturation magnetization of the inner cylinder 11 and the thickness of the inner cylinder. The curves in FIG. 15 are useful in considering the width of the current pulses $I_w$ used for reading operations. If the time duration of the read pulses becomes sufficiently great, eddy currents in the barrier film 12 in FIGS. 2 and 3 dissipates to zero, by the time the word pulse terminates and the curve 145 in FIG. 15 defines the relationship of the normalized word field and the normalized bit field. As the read pulse $I_w$ is reduced in width, the eddy currents continuing to flow in the barrier film 12 increase, and as the eddy currents increase, the respective curves 144 through 141 define the relationship of the normalized bit field and the normalized word field. The barrier film 12 in FIG. 1 constitutes a conductive shell or shorted turn which completely encompasses the inner magnetic film 11, and as the magnetization within the inner magnetic film 11 is caused to rotate during a read operation when a current $I_w$ is applied to the conductor 10, a current is induced in the barrier film layer 12 which is directed circumferientally around a closed contour. This is an eddy current which produces a solenoidal field which acts to retard the rotation rate of the magnetization within the inner magnetic film layer 11. It is pointed out that the outer magnetic film 13 experiences virtually none of the induced solenoidal field except at the remote ends. Hence, its rotation rate is not materially altered. The barrier induced time constant which governs the rate of rotation of magnetization in a magnetic cylinder varies linearly with respect to magnetic, electrical and physical structure parameters and non linearly with respect to the angular attitude of magnetization within the inner magnetic film. It has been established that the maximum eddy-current field $H_e$ is reached when the angular attitude of magnetization within the inner magnetic film reaches approximately 54°. A damping time constant of 70 nanoseconds was measured for a memory cell having a cooper barrier layer 6,000 Angstroms thick, a conductivity of $1.73 \times 10^{-6}$ ohm-centimeters and magnetic films 8,000 Angstroms thick. The saturation magnetization and anisotropy field of the magnetic films was 10,000 gauss and 5 oersteds, respectively, and the measurements were made so as to obtain substantially a unity value for the angle dependent factor. Some damping of the inner magnetic film is produced by the outer magnetic film layer. However, this is at least one order of magnitude less effective than the copper barrier layer of equivalent thickness.

Figure 16:
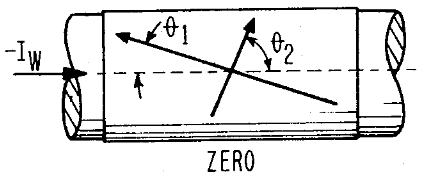
FIGS. 16 and 17 show rotational effects of magnetic fields during reading operation of memory cells in the respective binary zero and binary one states.
Figure 17:
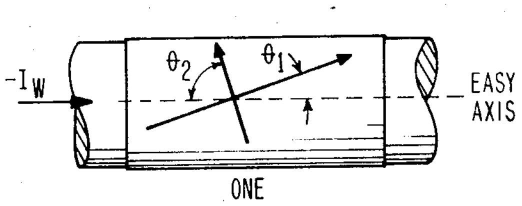

Next, nondestructive readout from a storage cell according to this invention is discussed, and for this purpose reference is made to FIGS. 16 and 17. When a read current $I_w$ is applied to the conductor 10 in FIG. 4, the forced attitude of magnetization within each of the film layers 11 and 13 is shown in FIGS. 16 and 17 for the respective binary zero and the binary one states. The angle $\theta_1$ corresponds to the forced rotation angle of the magnetization of the inner film 11, and the angle $\theta_2$ corresponds to the forced rotation angle of the magnetization of the top film 13. The figure 16 corresponds to the readout conditions for the binary zerostate, and FIG. 17 corresponds to the readout conditions for the binary one state. For a word pulse $I_w$ having a duration less than or equal to the damping time constant, the angular rotation of magnetization within the inner magnetic film 11 is limited to approximately 50° from its easy axis. The forced rotation angle of the outer magnetic film 13 rapidly approaches 90° during the rise time of the word current pulse $I_w$. The forced angular displacement of magnetization as shown in FIGS. 16 and 17 does not quite reach 90°. This results from the automatic bias field produced by the magnetization within the lower film whose rotation angle and rate of rotation has been curtailed by the action of the barrier film layer. This bias field originates principally from the self-demagnetizing field generated by the bounded length of the storage element. The magnitude of this self-induced easy axis bias field is given by the equation $$H_{bias}=H_d(z)\,[\text{COS}\theta_1-\text{COS}\theta_2]$$

where: $H_d(z)$ is the self-demagnetizing field characteristic of both magnetic film layers. The above equation assumes both magnetic films are identical in all respects. The direction of this bias field which develops during a word current $I_w$ is directed opposite to the longitudinal component of magnetization within the lower film layer 11. It is readily evident from FIGS. 16 and 17 that the direction of magnetization within the films 11 and 13 depends on the storage state of the device.

Figure 18:
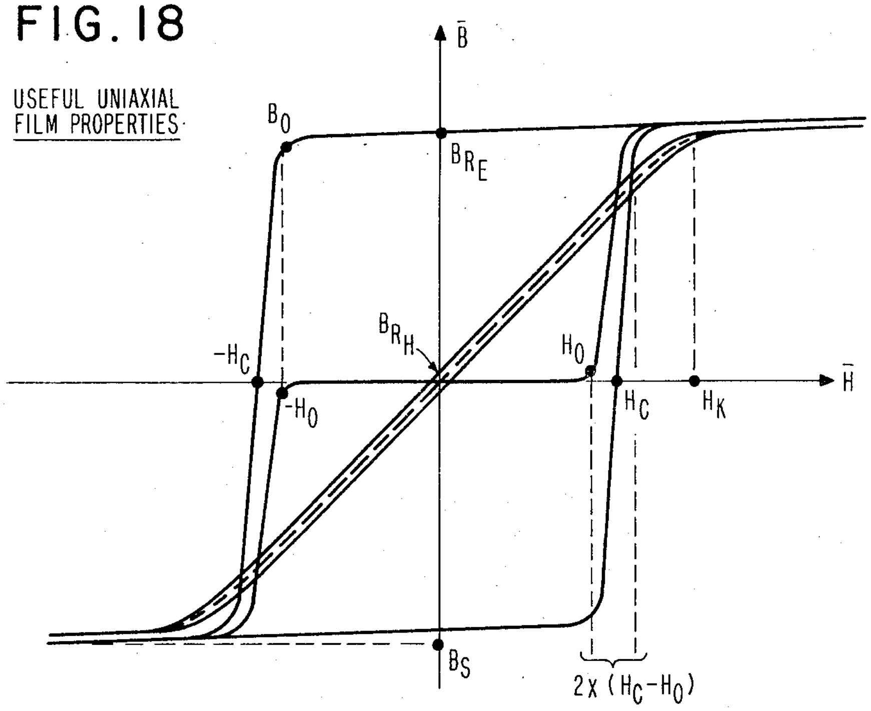
FIG. 18 illustrates some uniaxial film properties of the magnetic films employed in the memory cell of this invention.

It is pointed out that the properties of the film layers affect the performance characteristics of a memory cell according to this invention. FIG. 18 illustrates some of the useful uniaxial film properties of the magnetic films employed in constructing a memory cell of this invention. Listed below in Table 1 are the intrinsic uniaxial film properties, and listed in Table 2 are the definitions of the various properties. The magnetic properties defined in Table 2 are illustrated by the corresponding symbol in FIG. 18.

TABLE 1

| Property | Range of values | Preferred value |
|---|---|---|
| Ho | $.6\ Hk \leq /Ho/ \leq Hk$ | $Ho=Hk$ |
| Hc/Hk | $.5 \leq /Hc/Hk/ \leq 1.3$ | 1.0 |
| $B_{R_E}$ | $0.85\ Bs \leq /B_{R_E}/ = Bs$ | $B_{R_E} > .95\ Bs$ |
| $B_{R_{H_1}}$ | $0 \leq /B_{R_{H_1}}/ \leq 0.1 B_{R_E}$ | $B_{R_{H_1}}=0$ |
| $B_{R_{H_2}}$ | $0 \leq /B_{R_{H_2}}/ \leq 0.3\ B_{R_E}$ | $B_{R_{H_2}}=0$ |
| Bo | $.85\ B_{R_E} \leq /Bo/ \leq B_{R_E}$ | $BO=B_{R_E}$ |
| Composition | $70\% \leq Ni/Fe=83\%$ | $Ni/Fe=80\% \pm 1\%$ |
| λ | $/\lambda/ \leq 5.0 \times 10^{-6}$ | $/\lambda/ \leq 0.5 \times 10^{-6}$ |
| Skew angle | $/\beta/ < 3°$ | $/\beta/ < 0.2°$ |
| Dispersion angle | $/\alpha/ < 5.°$ | $/\alpha/ < 0.5°$ |

TABLE II

| | |
|---|---|
| Hc | Film coercive force. |
| Ho | Wall motion threshold field measured in oersteds. |
| Hk | Intrinsic anisotropy field. |
| Hc/Hk | Ratio of film coercive force to intrinsic anisotropy field. |
| $B_{R_E}$ | Easy axis remanent flux density. |
| $B_{R_{H_1}}$ | Hard axis remanent flux density given a hard axis drive field Hw within the interval; 0.6Hk</Hw/≤H.k |
| $B_{R_{H_2}}$ | Hard axis remanent flux density given a hard axis drive field /Hw/≥1.2 Hk. |
| Bo | Flux density measured just prior to magnetization reversal given an easy axis magnetizing field corresponding in value to slightly less than the wall motion threshold field Ho. |
| Deposit composition | Ratio by weight of nickel to iron. |
| λ | Magnetrostrictive constant. |
| Skew angle, β | Classical value as measured by Crowther or equivalent technique. |
| Dispersion angle, α | Classical value as measured by Crowther or equivalent technique. |

NOTE.—The two ferromagnetic films 11 and 13 in Figures 2 and 3 have relative thickness such that either or both of the following equations are satisfied:

(1) $M_{S_1}\sigma f_1 = M_{S_2}\sigma f_2$.

(2) $0 \leq / N_D (M_{S_1}\sigma f_1 - M_{S_2}\sigma f_2) / \leq \frac{H_O}{2}$.

where:

$M_{S_1}$=Saturation magnetization of first film layer.

$M_{S_2}$=Saturation magnetization of second film layer.

$\sigma f_1$=Thickness of first film layer.

$\sigma f_2$=Thickness of second film layer.

$N_D$=Demagnetizing factor which defines magnetostatic field in Central region of film bit.

$H_O$=Wall motion threshold field characteristic of magnetic film.

Figure 19:
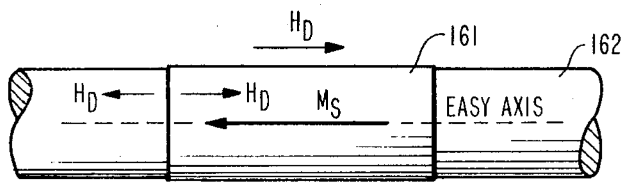
FIG. 19 illustrates a single layer magnetic film storage element.

The barrier film 12 consists of a conductive material which is copper, nickel, tin, etc. which is to be in excess of 200 Angstroms or that value which is sufficient to virtually eliminate exchange field coupling between the magnetic film producing them. Demagnetizing fields play a dominant role in the performance of the thin film areas intended for use as information storage cells since the storage function can be achieved only by proper control and use of these magnetostatic fields. For purposes of illustration, consider a single layer of magnetic film of finite length with uniaxial anisotropy deposited on the surface of a cylindrical substrate in the manner shown in FIG. 19. The single layer magnetic film 161 is deposited on a conductor 162. The saturation magnetization $M_s$ within this film is shown oriented along the easy magnetic axis which is parallel with the cylindrical axis. A demagnetizing field $H_d$ is shown with its direction in both regions, internal and external to the magnetic film layer. This demagnetizing field occurs because of a discontinuity in magnetization which takes place at the ends of the magnetic film layer 161. The intensity of this demagnetizing field varies greatly as a function of special position, being most intense for all positions close to the film edges. A film area such as illustrated in FIG. 19 is almost completely useless as a binary storage cell if the intensity of the demagnetizing field, measured internally to the film at a position equidistant from either end, is equal to the coercive force of the magnetic material comprising the film. This is discussed next with reference to FIG. 20.

Figure 20:
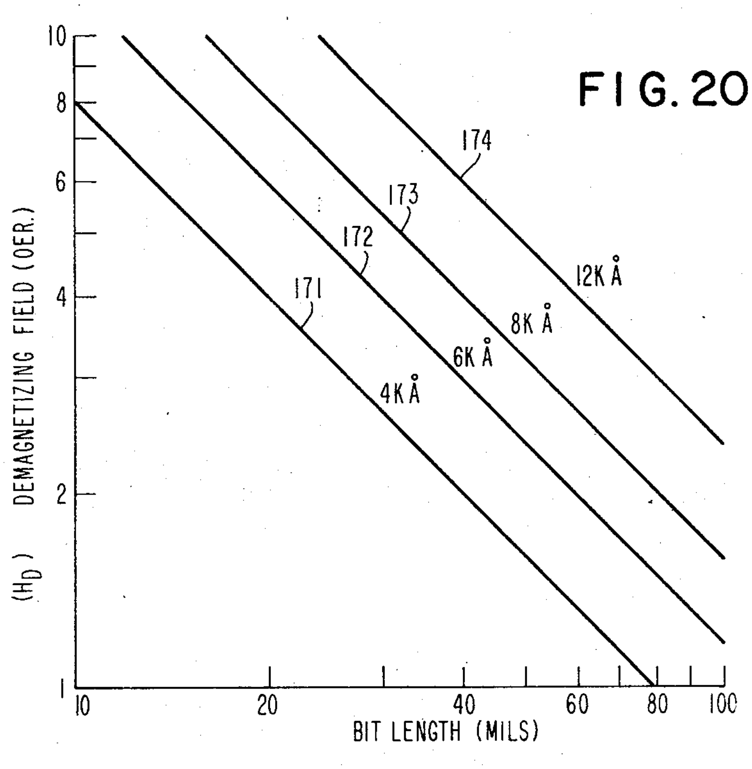
FIG. 20 shows a plot of bit length versus demagnetizing field.

Referring next to FIG. 20, the intensity of the demagnetizing field at the center of a cylindrical film is plotted as a function of the length of a magnetic cylinder (bit length) and the thickness of the magnetic film. The magnetic saturation $M_s$ of the magnetic film was assumed to be 10,000 gausses in plotting FIG. 20. The curves 171 through 174 in FIG. 20 demonstrate the relationship of bit length versus demagnetizing field for the respective film thickness of 4,000 Angstroms, 6,000 Angstroms, 8,000 Angstroms, and 12,000 Angstroms. A single layer magnetic films with axial orientation of magnetization cannot have thicknesses much in excess of 1,000 Angstroms for practical bit lengths. The amplitude of the response signal obtained from readout of such a film is at most a few millivolts in amplitude. Even if ideal film properties were attainable, the single layer magnetic film structure of FIG. 19 is not capable of providing stable nondestructive readout. Consequently, the memory cell in FIG. 1 is distinctive in the use of a nonmagnetic barrier film 12 sandwiched between two magnetic film layers 11 and 13 as illustrated in FIG. 2. The easy magnetic axis of both film layers in FIG. 2 is oriented to lie parallel with the longitudinal axis of the conductor 10. A unique magnetostatic situation arises when the magnetization within the outer film 13 and the inner film 11 assume directions anti-parallel with respect to one another. This anti-parallel situation is illustrated by the arrows in FIGS. 2 and 3. As a consequence of this anti-parallel quiesent arrangement of magnetizations, the self-demagnetizing fields generated by each film layer are oriented so as to mutually cancel the effects of one another. This situation is true irrespective of film thickness provided the condition $M_{S_1}{}^{\delta}f_1 = M_{S_2}{}^{\delta}f_2$ is observed. The practical virtues of mutual cancellation of self-demagnetizing fields can be realized if thickness of the barrier film 12 is less than approximately 5 × $10^{-3}L$ where $L$ is the bit length in mils.

There are four basic functions performed by the nonmagnetic barrier film layer 12 in FIGS. 2 and 3 which should be pointed out. First, it substantially eliminates magnetostatic exchange coupling between the outer film 13 and the inner film 11. Second, it provides a means of positioning two concentric magnetic films sufficiently close to one another such that useful mutual cancellation of demagnetizing fields may be achieved for more than 90 percent of the total bit length. Third, it serves to physically support the second magnetic film layer, and fourth, it provides a means of developing a dynamic solenoidal field which acts during energization of the word conductor 10 to retard the angular rotation rate of magnetization within only the underlying magnetic film layer 11. It is pointed out this function requires that the barrier film layer 12 consist of a conductive material.

Referring again to FIG. 19, let it be assumed that no demagnetizing fields exist during the quiescent or rest state of magnetization and that none are generated during energization. Causing a word current to flow along the conductor 162 in FIG. 19 produces a magnetizing field $H_w$ directed in the circumferiental direction. This word field causes the magnetization within the magnetic film to rotate away from the axial easy magnetic axis. Theoretically, it can be shown that undispersed magnetization will rotate so as to become parallel with the hard magnetic axis in the circumferiental direction of a word field $H_w$ with intensity equal to the intrinsic anisotropy field $H_k$ is provided. This is a property of magnetic films. Local variations in the intrinsic anisotropy field within the film and variations in skew and dispersion of magnetization, which are always present in practical films, serve to prevent such idealized single film devices in FIG. 2 from acting as stable storage elements for nondestructive read only stores. Instability of operation always results as the intensity of the word magnetizing field approaches the average intrinsic anisotropy field.

Referring again to FIG. 4, the amplitude of signals induced in the loop 18 in response to word currents $I_w$ is proportional to the time rate of change of the net magnetization encompassed by the sense loop 18. Since the magnetizations within the film layers are oriented anti-parallel to one another in the rest state of the memory device, the net static magnetization encompassed by the sense loop is numerically zero given identical magnetic films 11 and 13. If the forced rotation rates of the magnetization within the films 11 and 13 during energization by a current $I_w$ were identical, no signal would be measured by the sense amplifier 21. In order to derive a response signal and simultaneously provide the automatic easy axis bias field for the top magnetic film during energization with a current $I_w$, the rotational velocity of magnetization with the lower film 11 alone must be retarded. This is the primary magnetodynamic function of the conductive barrier film layer 12. The conductive barrier film layer 12 provides a conductive shell or shorted turn which completely encompasses the bottom magnetic film layer. As magnetization within the lower film layer 11 rotates during energization by a word current $I_w$, a current is inducted in the barrier film layer 12 which is directed circumferientally around a closed contour. This induced current produces a solenoidal field the ultimate action of which is to retard the rotation rate of magnetization within the underlying magnetic film layer 11. Since the top film layer 13 experiences virtually none of the induced solenoidal field, except at the remote ends of the film, its rotation rate is not materially altered. Hence, the difference in rotation rates of the magnetic films 11 and 13 gives rise to a time rate of change of magnetization which induces a signal in the loop 18, and this signal is then detected by the sense amplifier 21. The signals induced in the sense amplifier 21 in response to the word current $I_w$ provide indications of the binary storage state as explained above with reference to FIG. 8.

Figure 21:
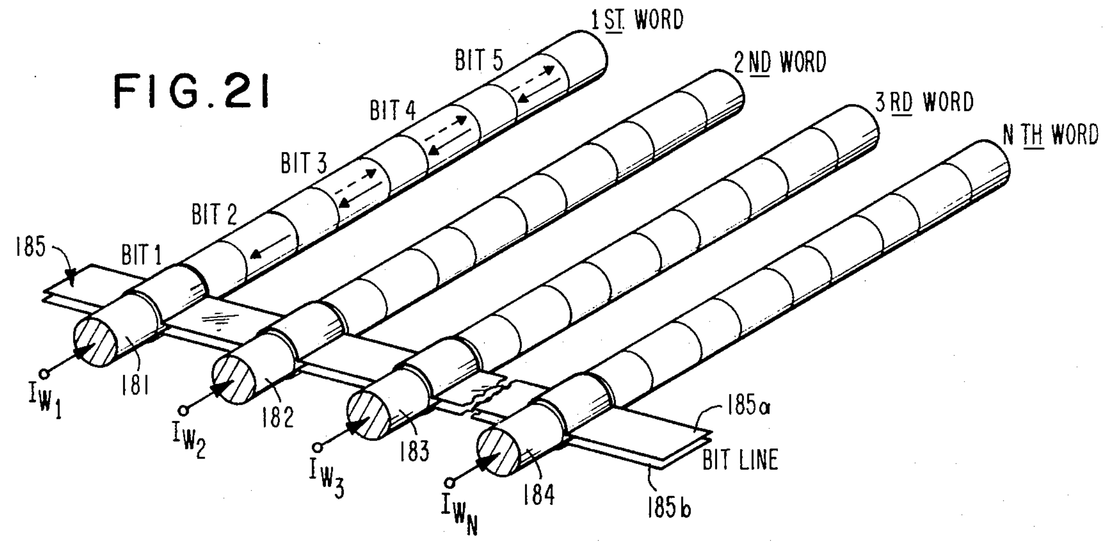
FIG. 21 illustrates a memory system with word lines in an array.

Reference is made next to FIG. 21 which illustrates the memory cell in FIG. 4 incorporated in a two dimensional array. Word conductors 181 through 184 are arranged according to one coordinate of an array. Bit lines are arranged according to the second coordinate of an array. The bit line or loop for bit 1 of each word is labelled 185. The bit line or loop 185 is composed of an upper conductor 185a and a lower conductor 185b. The bit lines for the remaining bits of each word are omitted in the interest of simplicity. Word drivers for supplying word current pulses $I_w$ to the word lines 181 through 184 during read and write operations are omitted likewise in the interest of simplicity, and the bit drivers and the sense amplifiers for the bit lines are omitted for the sake of simplicity also. Whenever a read operation is to be performed in the memory system of FIG. 21, a current $I_w$ is supplied to a selected one of the word lines 181 through 184. The current $I_w$ causes the five bits in the selected word line to be read, and signals are induced in the bit lines indicative of the information content of the selected word. Whenever a write operation is to take place in the memory system of FIG. 21, a plurality of N current pulses $I_w$ are applied to the selected one of the word lines 181 through 184, and simultaneously pairs of bit current pulses $I_b$ representing binary one or binary zero, as illustrated in FIG. 9, are applied to the associated bit lines. When the Nth pulse in a burst terminates, a new word is stored in the selected word line. Then one more pulse $I_w$ is applied to the selected word line thereby to disturb the bits of the selected word to their storage states in the manner explained above with reference to FIG. 14.

Figure 22:
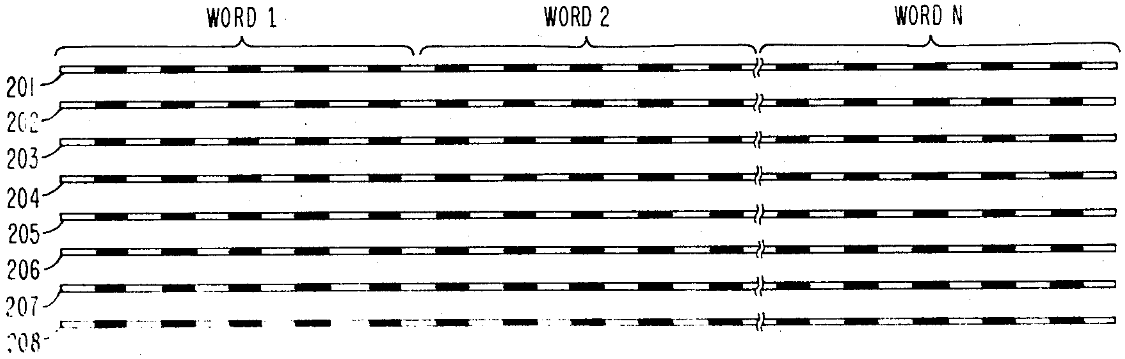
FIG. 22 illustrates a memory system with multiple words on each word line.

In FIG. 22 a matrix array is illustrated with word lines 201 through 208 disposed as shown with a plurality of words disposed on each wordline. The construction and operation of the array in FIG. 22 is similar to that in FIG. 21. However, the array in FIG. 22 permits simultaneous read and write operations. For example, a series of word pulses $I_w$ may be applied to the line 201 simultaneously as bit current pulses are applied to the bit lines associated with word one thereby to perform a writing operation in word one of word line 201. The current pulses $I_w$ applied to the line 201 may be utilized to read words 2 through N from the word line 201. Thus, it is seen that as writing takes place in word one of the selected line 201 in FIG. 22, reading operations may take place simultaneously in words 2 through word N of the word line 201.

The system arrangements in FIGS. 21 and 22 are illustrative of the manner in which the burst cycle writing techniques of this invention may be utilized in memory system arrangements. It is readily seen that the techniques of this invention readily lend themselves to other types of two dimensional and three dimensional memory systems. Each of the memory systems utilizes the novel method of operation which comprises the steps of (1) reading information by applying a word current pulse $I_w$ to a selected word line, (2) writing by applying N word current pulses $I_w$ to a selected word line and applying during each word current pulse $I_w$ a pair of bidirectional current pulses $I_b$ representing binary information to each one of a plurality of bit lines thereby to store binary information on the selected word line, and (3) pre-reading by applying at least one current pulse $I_w$ to the selected word line after a write operation has terminated thereby to disturb each storage cell toward its proper binary state for reasons explained above with reference to FIG. 14. Subsequent to the pre-read pulse or pulses the information in the selected word line is nondestructively read by sense amplifiers in response to a word current pulse $I_w$ applied to the selected word line.

While the invention has been particularly shown and described with reference to preferred embodiments thereof, it will be understood by those skilled in the art that the foregoing and other changes in form and details may be made therein without parting from the spirit and scope of the invention.

What is claimed is:

1. A storage device including a pair of coaxial magnetic films separated by a coaxial barrier film,
   writing means coupled to the storage device for writing binary information therein which includes first means for applying a burst of N word current pulses $I_w$ to the storage device and second means for applying a pair of syncronized bidirectional current pulses $I_b$ to the storage device for each one of the word current pulses $I_w$ with the amplitude of the current pulses $I_w$ and $I_b$ for changing the state of the storage device being inversely proportional to the burst number N.

2. A storage device including,
   a pair of coaxial cylindrical magnetic films separated by a coaxial cylindrical barrier film,
   writing means coupled to said storage device, said writing means including,
   a first conductor extending through the center of the storage device,
   a first driver connected to first conductor for supplying N current pulses $I_w$ to the first conductor during a write operation,
   a second conductor disposed around the storage device, and
   a second driver connected to the second conductor for supplying a pair of bidirectional current pulses $I_b$ to the second conductor for each current pulse $I_w$ supplied to the first conductor, the amplitude of the current pulses $I_w$ and $I_b$ for changing the state of the storage device being inversely proportional to the number N.

3. The apparatus of claim 2 wherein a plurality of words are disposed on each word line.

4. A storage system including,
   a plurality of word lines disposed according to a first coordinate of an array,
   a plurality of bit lines disposed according to a second coordinate of an array,
   a storage element disposed at each coordinate intersection of the plurality of word lines and the plurality of bit lines,
   each storage element including a pair of coaxial anisotropic magnetic films separated by a coaxial barrier film, the storage element assembly being disposed around the word line at each coordinate intersection,
   a bit driver connected to each bit line for supplying a pair of bi-directional bit current pulses $I_b$ for writing operations,
   a sense amplifier connected to each bit line for the purpose of detecting the storage state of the selected bit during read operations, and
   a word current driver connected to each word line for supplying a single word current pulse $I_w$ to a selected word line for a read operation and a burst of N word current pulses $I_w$ to a selected word line during a write operation and simultaneously with each word current pulse $I_w$ a pair of synchronized bit current pulses $I_b$ are supplied to each bit line during a write operation to represent binary information, the amplitude of the word current pulses $I_w$ and the amplitude of the bit current pulses $I_b$ being inversely proportional to the number N of word current pulses.

5. The apparatus of claim 4 wherein the selected word current driver is operated to supply a word current pulse $I_w$ to the selected word line after a writing operation is completed to perform a pre-read operation by disturbing the storage elements toward their appropriate binary storage state, and all sense amplifiers are disabled during this pre-read operation.

6. A storage arrangement including:
   a storage element, said storage element including a first conductor which serves as a substrate, a first magnetic film disposed on the first conductor, a barrier film disposed on the first magnetic film, a second magnetic film disposed on the barrier film, a second conductor disposed around and electrically isolated from the second magnetic film, word driver means connected to the first conductor for applying a burst of N word current pulses $I_w$ thereto during a write operation, and bit driver means connected to the second conductor for applying a pair of synchronized bit current pulses $I_b$ to the second conductor for each one of the N word current pulse $I_w$ applied to the first conductor, the amplitude of the word current pulses $I_w$ and the amplitude of the bit current pulses $I_b$ being inversely proportional to the number N.

7. A storage arrangement including:

a storage element, said storage element including a first conductor which serves as a substrate, a first magnetic film disposed on the first conductor, a barrier film disposed on the first magnetic film, a second magnetic film disposed on the barrier film, a second conductor disposed around and electrically isolated from the second magnetic film, word driver means connected to the first conductor for applying a burst of N word current pulses $I_w$ thereto during a write operation, bit driver means connected to the second conductor for applying a pair of synchronized bit current pulses $I_b$ to the second conductor for each one of the N word current pulse $I_w$ applied to the first conductor, the amplitude of the word current pulses $I_w$ and the amplitude of the bit current pulses $I_b$ required to change the state of the storage element being inversely proportional to the number N, sense means connected to the second conductor for indicating the state of the storage element in response to a single current pulse $I_w$ during a read operation, and means to operate the word driver means after a write operation has terminated to perform a pre-read operation by applying one or more current pulses $I_w$ to the first conductor thereby to disturb the storage element toward its storage state.

8. A method of writing in storage device which includes a pair of coaxial magnetic films separated by a coaxial barrier film, the method of comprising the steps of:

1. applying a burst of N word current pulses $I_w$ to the storage device,
2. simultaneously applying a pair of synchronized bidirectional current pulses $I_b$ to the storage device for each one of the word current pulses Iw, and
3. making the amplitude of the current pulses $I_w$ and $I_b$ for changing the state of the storage device inversely proportional to the burst number N.

9. A method of operating a magnetic memory device which comprises the steps of:

1. applying a word current pulse $I_w$ to a selected one of a plurality of word lines for reading information stored on said selected word line, and
2. applying a plurality of N word current pulses $I_w$ to a selected word line and applying during each word current pulse a pair of synchronized bidirectional current pulses $I_b$ representing binary information to each one of a plurality of bit lines thereby to store binary information in the selected word line.

10. A method of operating a magnetic memory device which comprises the steps of:

1. applying a word current pulse $I_w$ to a selected one of a plurality of word lines for reading information stored on said selected word line,
2. applying a plurality of N word current pulses $I_w$ to a selected word line and applying during each word current pulse a pair of synchronized bidirectional current pulses $I_b$ representing binary information to each one of a plurality of bit lines to store binary information in the selected word line, and
3. applying at least one pre-read current pulse $I_w$ to the selected word line thereby to disturb each memory cell toward its binary storage state before performing subsequent read operations from the selected word line in which new information is stored.

* * * * *